(12) United States Patent
Moasher et al.

(10) Patent No.: US 11,114,917 B1
(45) Date of Patent: Sep. 7, 2021

(54) ELECTRIC MOTOR ROTOR FOR HYBRID MODULE

(71) Applicant: Schaeffler Technologies AG & Co. KG, Herzogenaurach (DE)

(72) Inventors: Mohammad Moasher, Fairlawn, OH (US); Victor Norwich, Wooster, OH (US); Kyle Nelson, Wadsworth, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/802,277

(22) Filed: Feb. 26, 2020

(51) Int. Cl.
| | | |
|---|---|---|
| *H02K 7/10* | (2006.01) | |
| *H02K 7/00* | (2006.01) | |
| *H02K 11/21* | (2016.01) | |
| *H02K 24/00* | (2006.01) | |
| *B60K 6/26* | (2007.10) | |
| *B60K 6/38* | (2007.10) | |
| *B60K 6/54* | (2007.10) | |
| *B60K 6/24* | (2007.10) | |
| *F16H 41/24* | (2006.01) | |
| *F16H 45/00* | (2006.01) | |

(52) U.S. Cl.
CPC .............. *H02K 7/006* (2013.01); *B60K 6/24* (2013.01); *B60K 6/26* (2013.01); *B60K 6/38* (2013.01); *B60K 6/54* (2013.01); *H02K 7/10* (2013.01); *H02K 11/21* (2016.01); *H02K 24/00* (2013.01); *B60Y 2200/92* (2013.01); *F16H 41/24* (2013.01); *F16H 45/00* (2013.01); *F16H 2045/007* (2013.01)

(58) Field of Classification Search
CPC .......... H02K 7/006; H02K 7/10; H02K 11/21; B60K 6/26; B60K 6/38; F16H 2045/007
See application file for complete search history.

(56) References Cited

U.S. PATENT DOCUMENTS

| | | |
|---|---|---|
| 5,542,517 A | 8/1996 | Perusky |
| 2002/0036434 A1 | 3/2002 | Tsuzuki et al. |
| 2012/0217825 A1* | 8/2012 | Kasuya ................. H02K 7/083 310/54 |
| 2012/0319514 A1* | 12/2012 | Iwase ..................... H02K 7/006 310/78 |
| 2016/0263984 A1* | 9/2016 | Kasuya ................... B60K 6/44 |
| 2017/0122421 A1 | 5/2017 | Frait et al. |

(Continued)

FOREIGN PATENT DOCUMENTS

| | | |
|---|---|---|
| JP | 2011213189 A | 10/2011 |
| JP | 2013095383 A | 5/2013 |

*Primary Examiner* — Huan Le
(74) *Attorney, Agent, or Firm* — Kevin L. Parks

(57) ABSTRACT

An electric motor rotor for a hybrid module includes a rotor carrier, a piston carrier, and a tapered snap ring. The rotor carrier includes a first inner circumferential surface with an inner spline for receiving a first plurality of clutch plates, a second inner circumferential surface, radially outside of the first inner circumferential surface, a radial wall connecting the first inner circumferential surface to the second inner circumferential surface, and a groove with a conical wall. The piston carrier includes a radial outer ring installed between the groove and the radial wall. The tapered snap ring installed in the groove and urges the piston carrier into contact with the radial wall.

18 Claims, 2 Drawing Sheets

(56) References Cited

U.S. PATENT DOCUMENTS

2019/0337375 A1\* 11/2019 Simon ................. H02K 1/02
2020/0040974 A1  2/2020 Payne et al.
2020/0040976 A1  2/2020 Steiner et al.

\* cited by examiner

ELECTRIC MOTOR ROTOR FOR HYBRID MODULE

TECHNICAL FIELD

The present disclosure relates generally to a hybrid module, and more specifically to an electric motor rotor for a hybrid module.

BACKGROUND

Hybrid modules are known. Examples are shown in commonly-assigned U.S. patent application Ser. No. 16/527,329 titled HYBRID MODULE, Ser. No. 16/527,663 titled HYBRID MODULE CONFIGURATION and Ser. No. 16/527,686 titled HYBRID MODULE, all of which are hereby incorporated by reference as if set forth fully herein.

SUMMARY

Example aspects broadly comprise an electric motor rotor for a hybrid module including a rotor carrier, a piston carrier, and a tapered snap ring. The rotor carrier includes a first inner circumferential surface with an inner spline for receiving a first plurality of clutch plates, a second inner circumferential surface, radially outside of the first inner circumferential surface, a radial wall connecting the first inner circumferential surface to the second inner circumferential surface, and a groove with a conical wall. The piston carrier includes a radial outer ring installed between the groove and the radial wall. The tapered snap is ring installed in the groove and urges the piston carrier into contact with the radial wall.

In an example embodiment, the second inner circumferential surface has a key, and the radial outer ring has a slot drivingly engaged with the key. In an example embodiment, the electric motor rotor has a tapered nut. The piston carrier includes a threaded portion, the tapered nut is installed on the threaded portion, and the tapered nut includes a conical surface urging the tapered snap ring radially outward into the groove. In an example embodiment, the electric motor rotor includes a plurality of rotor segments installed on an outer circumferential surface of the rotor carrier.

In some example embodiments, the electric motor rotor includes the first plurality of clutch plates drivingly engaged with the inner spline, and a piston, sealed to the piston carrier, for axially pressing the first plurality of clutch plates to transmit torque. In an example embodiment, the electric motor rotor has an annular shim. The piston includes an annular protrusion for pressing the first plurality of clutch plates, and the annular shim is disposed axially between the annular protrusion and the first plurality of clutch plates. In an example embodiment, the piston is sealed to the piston carrier by a radially outer seal and a radially inner seal. In some example embodiments, the electric motor rotor includes a piston sealed to the piston carrier, a balance dam sealed to the piston, and a snap ring. The piston carrier comprises a groove and the snap ring is installed in the groove and axially retains the balance dam. In an example embodiment, the electric motor rotor includes a spring for urging the piston axially away from the balance dam.

In some example embodiments, the electric motor rotor includes a resolver adapter plate and a resolver rotor. The resolver adapter plate has a radially outer ring portion with a first axial slot, a radially inner ring portion with a second axial slot, and a conical connector portion extending from the radially inner ring portion to the radially outer ring portion. The resolver rotor has a first key installed in the first axial slot. The second inner circumferential surface has a second key installed in the second axial slot. In some example embodiments, the resolver adapter plate includes a radial wall contacting a first axial face of the resolver rotor, and a radially extending tab contacting a second axial face of the resolver rotor, opposite the first axial face. In an example embodiment, the resolver adapter plate has a tight slip fit with the resolver rotor. In an example embodiment, the radially extending tab is formed by staking.

In some example embodiments, the electric motor rotor includes a torque converter fixed to the rotor carrier. In some example embodiments, the rotor carrier has a first annular segment, and the torque converter has a second annular segment fixed to the first annular segment. In an example embodiment, the rotor carrier has a third inner circumferential surface, and the torque converter has an outer circumferential surface installed in the third inner circumferential surface for radially positioning the torque converter in the rotor carrier.

Example aspects also comprise a hybrid module for connecting a combustion engine to a multi-speed transmission. The hybrid module includes an electric motor stator, an electric motor rotor with a torque converter, a module input shaft, and first and second pluralities of clutch plates. The torque converter includes an impeller, a turbine, and a stator for transmitting torque through a transmission fluid, a torque converter clutch for transmitting torque through a mechanical connection, and a damper arranged in a torque path between the turbine or the torque converter clutch and the multi-speed transmission. The damper has an output hub arranged for driving engagement with an input shaft of the multi-speed transmission. The module input shaft has a clutch inner carrier. The first plurality of clutch plates is drivingly engaged with the rotor carrier and the second plurality of clutch plates is drivingly engaged with the clutch inner carrier.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
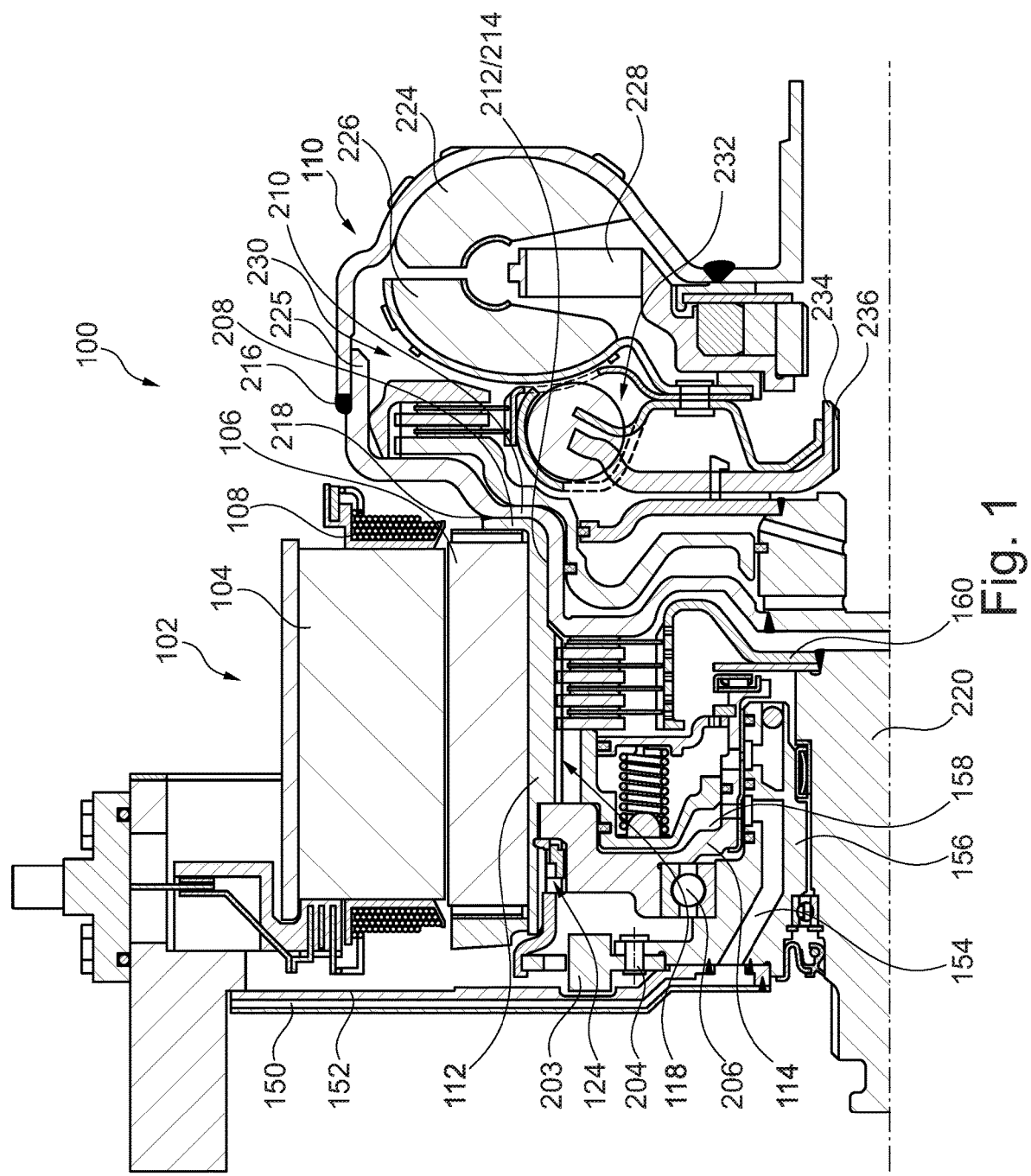
FIG. 1 illustrates a top-half cross-sectional view of a hybrid module according to an example aspect of the present disclosure.
Figure 2:
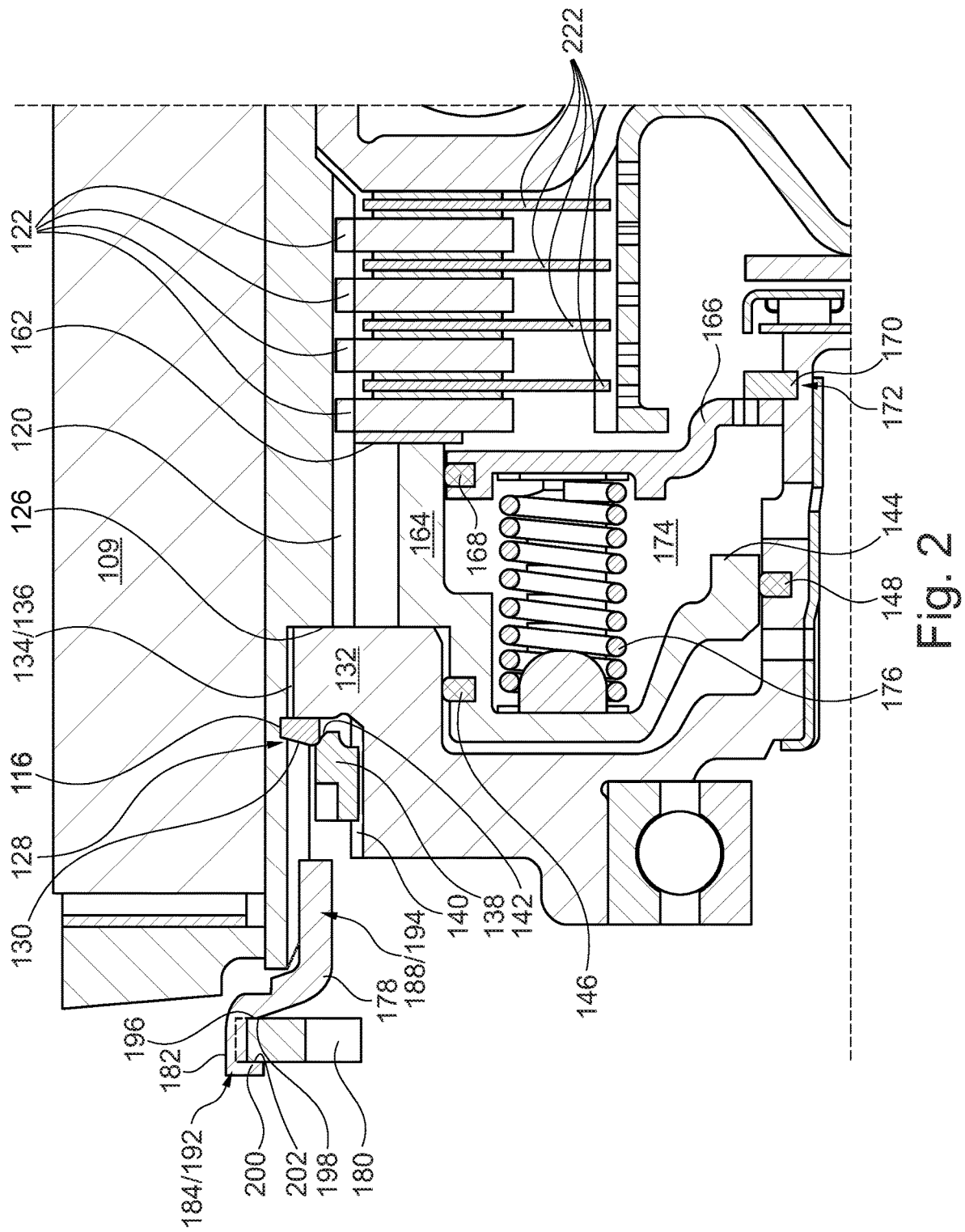
FIG. 2 illustrates a detail view of a portion of the hybrid module of FIG. 1.

The following description is made with reference to FIGS. 1-2. FIG. 1 illustrates a top-half cross-sectional view of hybrid module 100 according to an example aspect of the present disclosure. FIG. 2 illustrates a detail view of a portion of hybrid module 100 of FIG. 1. Hybrid module 100 for a motor vehicle (not shown) includes electric motor 102 with stator 104 and rotor 106. Stator 104 is fixed to a housing and receives electrical energy in coils 108 to rotate rotor segments 109 installed on an outer circumferential surface of rotor 106. Rotor 106 works in conjunction with a combustion engine (not shown) to propel the motor vehicle. That is, rotor 106 includes torque converter 110 drivingly engaged with a multi-speed vehicle transmission and transmits torque to the vehicle driveline as is known in the art.

Electric motor rotor 106 includes rotor carrier 112, piston carrier 114 and tapered snap ring 116. The rotor carrier includes inner circumferential surface 118 with inner spline 120 for receiving a plurality of clutch plates 122, inner circumferential surface 124, radially outside of inner circumferential surface 118, radial wall 126 connecting surfaces 118 and 124, and groove 128 with conical wall 130. Piston carrier 114 includes radial outer ring 132 installed between the groove and the radial wall. Tapered snap ring 116 is installed in the groove and urges the piston carrier into contact with the radial wall. Inner circumferential surface 124 includes key 134 and radial outer ring 132 includes slot 136 drivingly engaged with the key.

The electric motor rotor also includes tapered nut 138. Piston carrier 114 includes threaded portion 140, tapered nut 138 is installed on the threaded portion, and the tapered nut includes conical surface 142 urging the tapered snap ring radially outward into the groove. That is, when the nut is tightened on the threaded portion, the conical surface extends under the tapered snap ring and radially expands the snap ring. As the snap ring expands, the taper on the snap ring is forced against conical wall 130 of groove 128, urging the snap ring away from the conical wall and towards piston carrier 114. Therefore, as nut 138 is tightened, piston carrier outer ring 132 is pressed tight against radial wall 126. As described below, eliminating axial lash between rotor carrier 112 and piston carrier 114 reduces clutch liftoff tolerance.

Electric motor rotor 106 includes clutch plates 122 and piston 144. Clutch plates 122 are drivingly engaged with inner spline 120. Piston 144 is sealed to the piston carrier by radially outer seal 146, installed in piston 144, and radially inner seal 148, installed in piston carrier 114. Piston 144 is for axially pressing the plurality of clutch plates to transmit torque. That is, hydraulic pressure is introduced through channel 150 in bulkhead 152 and channel 154 in hub 156 and enters hydraulic chamber 158. High pressure in chamber 158 urges piston 144 towards clutch plates 122 to engage the clutch and transmit torque from clutch inner carrier 160 to rotor carrier 112.

Electric motor rotor 106 includes shim 162. Piston 144 includes annular protrusion 164 for pressing clutch plates 122 and shim 162 is disposed axially between the annular protrusion and the plurality of clutch plates. A thickness of shim 162 is selected to adjust clutch liftoff. That is, in order to better control a distance between the piston and the clutch plates when the clutch is disengaged, components for each rotor carrier assembly can be measured and a particular thickness of shim can be selected to reduce a liftoff tolerance when the clutch is disengaged. Reduced tolerance helps improve clutch engagement and reduce drag when the clutch is disengaged.

Electric motor rotor 106 includes piston 144 sealed to piston carrier 114 as described above, balance dam 166 sealed to piston 144 by seal 168, and snap ring 170. Piston carrier 114 includes groove 172 and the snap ring is installed in the groove. The snap ring axially retains the balance dam. The balance dam retains fluid in balance chamber 174 between piston 144 and balance dam 166 to counter dynamic effects from rotating fluid in hydraulic chamber 158. That is, when the fluid in hydraulic chamber 158 is rotated, centrifugal effects force it radially outward urging the piston to engage the clutch even without any engagement pressure for the fluid in chamber 158. Rotating fluid in the balance chamber experiences a similar dynamic effect and counters the effect in chamber 158 so that the piston remains mostly balanced and drag in the clutch is limited. Spring 176 urges piston 144 away from balance dam 166.

Electric motor rotor 106 includes resolver adapter plate 178 and resolver rotor 180. The resolver adapter plate includes radially outer ring portion 182 with axial slot 184, radially inner ring portion 186 with axial slot 188, and conical connector portion 190 extending from the inner ring portion to the outer ring portion. The resolver rotor includes key 192 installed in axial slot 184, and inner circumferential surface 124 includes key 194 installed in axial slot 188. The resolver adapter plate also includes radial wall 196 contacting axial face 198 of the resolver rotor, and radially extending tab 200 contacting axial face 202 of the resolver rotor, opposite axial face 198.

The resolver adapter plate has a tight slip fit with the resolver rotor. The radially extending tab is formed by staking. That is, the resolver adapter plate is retained tight between radial wall 196 and tab 200 by resolver adapter plate deformed against axial face 202. Material extending axially past the resolver rotor is pressed with a die (not shown) to axially and radially form the material to tightly retain the resolver rotor. Resolver stator 203 is fixed to hub 156 by rivet 204 and together, the resolver rotor and the resolver stator communicate a rotational position of the rotor carrier to a controller. Bearing 206 installed between piston carrier 114 and hub 156 positions rotor 106 relative to stator 104, and permits relative rotation between the two with minimal friction.

Electric motor rotor 106 includes torque converter 110 fixed to rotor carrier 112. Rotor carrier 112 includes annular segment 208 and torque converter 110 includes annular segment 210 fixed to annular segment 208. Rotor carrier 112 includes inner circumferential surface 212 and torque converter 110 includes outer circumferential surface 214 installed on surface 212 for radially positioning the torque converter in the rotor carrier. Arrangement of segments 208 and 210, and surfaces 212 and 214 permits an assembled torque converter to be installed on the rotor carrier. That is, a fully assembled and welded (e.g., by weld 216) torque converter can be fixed to rotor carrier 112 by weld 218.

Hybrid module 100 is for connecting a combustion engine (not shown) to a multi-speed transmission (not shown). The module includes electric motor stator 102, electric motor rotor 106 with torque converter 110, module input shaft 220 with clutch inner carrier 160, clutch plates 122 and clutch plates 222. The torque converter includes impeller 224 fixed to cover shell 225 at weld 216, turbine 226, and stator 228 for transmitting torque through a transmission fluid (not shown). The torque converter also includes torque converter clutch 230 for transmitting torque through a mechanical connection, and damper 232 arranged in a torque path between the turbine or the torque converter clutch and the multi-speed transmission. The damper includes output flange 234 arranged for driving engagement with an input shaft (not shown) of the multi-speed transmission (at spline 236, for example). Clutch plates 122 are drivingly engaged with the rotor carrier, and clutch plates 222 are drivingly engaged with the clutch inner carrier.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Hybrid module
102 Electric motor
104 Stator
106 Rotor
108 Stator coils
109 Rotor segments
110 Torque converter
112 Rotor carrier
114 Piston carrier
116 Tapered snap ring
118 Inner circumferential surface (first)
120 Inner spline (rotor carrier)
122 Plurality of clutch plates (first)
124 Inner circumferential surface (second)
126 Radial wall (rotor carrier)
128 Groove (rotor carrier)
130 Conical wall (groove)
132 Radial outer ring (piston carrier)
134 Key (second inner circumferential surface)
136 Slot (radial outer ring)
138 Tapered nut
140 Threaded portion (piston carrier)
142 Conical surface (tapered nut)
144 Piston
146 Radially outer seal (piston)
148 Radially inner seal (piston carrier)
150 Channel (bulkhead)
152 Bulkhead
154 Channel (hub)
156 Hub
158 Hydraulic chamber
160 Clutch inner carrier
162 Shim
164 Annular protrusion (piston)
166 Balance dam
168 Seal (balance dam)
170 Snap ring
172 Groove (piston carrier)
174 Balance chamber
176 Spring
178 Resolver adapter plate
180 Resolver rotor
182 Radially outer ring portion
184 Axial slot (first)
186 Radially inner ring portion
188 Axial slot (second)
190 Conical connector portion
192 Key (first)
194 Key (second)
196 Radial wall (resolver adapter plate)
198 Axial face (first, resolver rotor)
200 Radially extending tab (resolver adapter plate)
202 Axial face (second, resolver rotor)
203 Resolver stator
204 Rivet (resolver stator to hub)
206 Bearing
208 Annular segment (first, rotor carrier)
210 Annular segment (second, torque converter)
212 Inner circumferential surface (third)
214 Outer circumferential surface
216 Weld (torque converter)
218 Weld (torque converter to rotor carrier)
220 Module input shaft
222 Plurality of clutch plates (second)
224 Impeller
225 Cover shell
226 Turbine
228 Stator
230 Torque converter clutch
232 Damper
234 Output flange
236 Spline (output flange)

What is claimed is:

1. An electric motor rotor for a hybrid module comprising:
a rotor carrier comprising:
a first inner circumferential surface comprising an inner spline for receiving a first plurality of clutch plates;
a second inner circumferential surface, radially outside of the first inner circumferential surface;
a radial wall connecting the first inner circumferential surface to the second inner circumferential surface; and
a groove comprising a conical wall;
a piston carrier including a radial outer ring installed between the groove and the radial wall; and
a tapered snap ring installed in the groove and urging the piston carrier into contact with the radial wall.

2. The electric motor rotor of claim 1 wherein:
the second inner circumferential surface comprises a key; and
the radial outer ring comprises a slot drivingly engaged with the key.

3. The electric motor rotor of claim 1 further comprising a tapered nut, wherein:
the piston carrier comprises a threaded portion;
the tapered nut is installed on the threaded portion; and
the tapered nut includes a conical surface urging the tapered snap ring radially outward into the groove.

4. The electric motor rotor of claim 1 further comprising a plurality of rotor segments installed on an outer circumferential surface of the rotor carrier.

5. The electric motor rotor of claim 1 further comprising:
the first plurality of clutch plates drivingly engaged with the inner spline; and
a piston, sealed to the piston carrier, for axially pressing the first plurality of clutch plates to transmit torque.

6. The electric motor rotor of claim 5 further comprising an annular shim, wherein:
the piston comprises an annular protrusion for pressing the first plurality of clutch plates; and
the annular shim is disposed axially between the annular protrusion and the first plurality of clutch plates.

7. The electric motor rotor of claim 5 wherein the piston is sealed to the piston carrier by a radially outer seal and a radially inner seal.

8. The electric motor rotor of claim 1 further comprising:
a piston sealed to the piston carrier;
a balance dam sealed to the piston; and
a snap ring, wherein the piston carrier comprises a groove and the snap ring is installed in the groove and axially retains the balance dam.

9. The electric motor rotor of claim 8 further comprising a spring for urging the piston axially away from the balance dam.

10. The electric motor rotor of claim 1 further comprising:
a resolver adapter plate comprising:
a radially outer ring portion comprising a first axial slot;
a radially inner ring portion comprising a second axial slot; and
a conical connector portion extending from the radially inner ring portion to the radially outer ring portion; and
a resolver rotor comprising a first key installed in the first axial slot, wherein the second inner circumferential surface comprises a second key installed in the second axial slot.

11. The electric motor rotor of claim 10 wherein the resolver adapter plate comprises:
a radial wall contacting a first axial face of the resolver rotor; and
a radially extending tab contacting a second axial face of the resolver rotor, opposite the first axial face.

12. The electric motor rotor of claim 11 wherein the resolver adapter plate has a tight slip fit with the resolver rotor.

13. The electric motor rotor of claim 11 wherein the radially extending tab is formed by staking.

14. The electric motor rotor of claim 1 further comprising a torque converter fixed to the rotor carrier.

15. The electric motor rotor of claim 14 wherein:
the rotor carrier comprises a first annular segment; and
the torque converter comprises a second annular segment fixed to the first annular segment.

16. The electric motor rotor of claim 15 wherein:
the rotor carrier comprises a third inner circumferential surface; and
the torque converter comprises an outer circumferential surface installed in the third inner circumferential surface for radially positioning the torque converter in the rotor carrier.

17. The electric motor rotor of claim 14 wherein:
the rotor carrier comprises a third inner circumferential surface; and
the torque converter comprises an outer circumferential surface installed in the third inner circumferential surface for radially positioning the torque converter in the rotor carrier.

18. A hybrid module for connecting a combustion engine to a multi-speed transmission, comprising:
an electric motor stator;
the electric motor rotor of claim 17, wherein the torque converter comprises:
an impeller, a turbine, and a stator for transmitting torque through a transmission fluid;
a torque converter clutch for transmitting torque through a mechanical connection; and
a damper arranged in a torque path between the turbine or the torque converter clutch and the multi-speed transmission, the damper comprising an output hub arranged for driving engagement with an input shaft of the multi-speed transmission;
a module input shaft comprising a clutch inner carrier;
the first plurality of clutch plates drivingly engaged with the rotor carrier; and
a second plurality of clutch plates drivingly engaged with the clutch inner carrier.

* * * * *